(12) United States Patent
Tanaka et al.

(10) Patent No.: US 9,548,014 B2
(45) Date of Patent: Jan. 17, 2017

(54) INFORMATION PROCESSING APPARATUS AND INFORMATION PROCESSING METHOD

(71) Applicant: CANON KABUSHIKI KAISHA, Tokyo (JP)

(72) Inventors: Yasumi Tanaka, Funabashi (JP); Colin Fahey, Irvine, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/451,371

(22) Filed: Aug. 4, 2014

(65) Prior Publication Data
US 2016/0035134 A1 Feb. 4, 2016

(51) Int. Cl.
| | |
|---|---|
| G06K 7/10 | (2006.01) |
| G06K 7/14 | (2006.01) |
| G09G 3/00 | (2006.01) |
| G06K 9/62 | (2006.01) |
| G06T 7/00 | (2006.01) |
| G06F 3/00 | (2006.01) |

(52) U.S. Cl.
CPC ............ *G09G 3/003* (2013.01); *G06F 3/00* (2013.01); *G06K 9/6203* (2013.01); *G06K 9/6215* (2013.01); *G06T 7/0024* (2013.01); *G09G 2354/00* (2013.01); *G09G 2380/00* (2013.01)

(58) Field of Classification Search
CPC ............ G06K 7/10; G06K 7/14; G06K 17/00; G06K 19/00; G06K 19/06
USPC ................. 235/454, 494, 375, 487
See application file for complete search history.

(56) References Cited

U.S. PATENT DOCUMENTS

| | | | |
|---|---|---|---|
| 8,249,361 B1 | 8/2012 | Steffens | |
| 2006/0071945 A1 | 4/2006 | Anabuki | |
| 2006/0071946 A1 | 4/2006 | Anabuki | |
| 2009/0022369 A1* | 1/2009 | Satoh | G01B 21/04 382/106 |
| 2010/0017407 A1* | 1/2010 | Beniyama et al. | 707/6 |
| 2010/0026714 A1 | 2/2010 | Utagawa | |

(Continued)

FOREIGN PATENT DOCUMENTS

| | | |
|---|---|---|
| JP | 2007-172596 A | 7/2007 |
| JP | 2008-134161 A | 6/2008 |
| JP | 2012-048456 A | 3/2012 |

OTHER PUBLICATIONS

WIPO, International Search Report and Written Opinion of the International Searching Authority for PCT/JP2015/003911, Oct. 13, 2015.

(Continued)

*Primary Examiner* — Edwyn Labaze
(74) *Attorney, Agent, or Firm* — Canon U.S.A., Inc. IP Division

(57) ABSTRACT

A plurality of types of arrangement pattern candidates are generated. Each arrangement pattern candidate is an arrangement pattern candidate of a plurality of indices in a physical space used to calculate the position and orientation of the viewpoint. The arrangement pattern candidate enables observation of a predetermined number or more of indices from a position in an area where mixed reality can be experienced in the physical space. Information representing the arrangement pattern of a plurality of indices in the physical space is generated by using the generated types of arrangement pattern candidates.

28 Claims, 11 Drawing Sheets

(56) References Cited

U.S. PATENT DOCUMENTS

2010/0265164 A1* 10/2010 Okuno .................. G06T 19/006
345/8

OTHER PUBLICATIONS

Bajura Michael et al., Dynamic Registration Correction in Augmented-Reality Systems, Proceedings of the Virtual Reality Annual International Symposium, Mar. 1995.

* cited by examiner

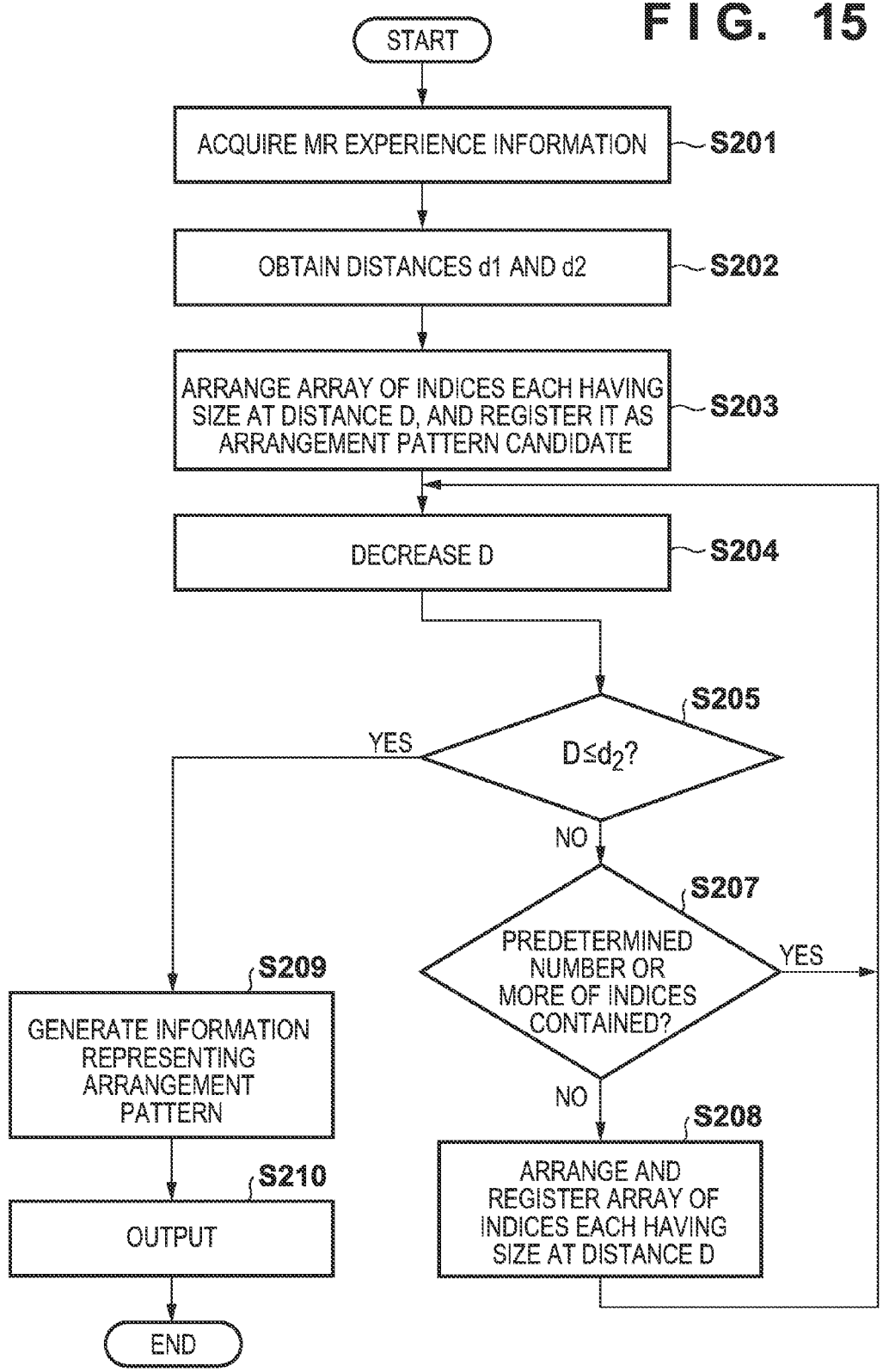

INFORMATION PROCESSING APPARATUS AND INFORMATION PROCESSING METHOD

BACKGROUND

Field of the Invention

The present invention relates to a technique for presenting Mixed Reality (MR).

Description of the Related Art

Recently, studies of MR aiming at seamless combination of a physical space and virtual space have been made actively. An image display device which presents mixed reality is, for example, a device which displays an image obtained by superimposing and rendering, on an image of a physical space that is sensed by an image sensing device such as a video camera, an image in a virtual space (for example, a virtual object or character information rendered by computer graphics) that is generated in accordance with the position and orientation of the image sensing device. As such a device, for example, a Head Mounted Display (HMD) is usable, e.g., see Japanese Patent Application No. 2006-320872, Japanese Patent Application No. 2010-189458, and Japanese Patent Laid-Open No. 2007-172596. The image display device is also implemented by an optical see-through method of displaying, on an optical see-through display mounted on the head of a user, an image in a virtual space that is generated in accordance with the position and orientation of the viewpoint of the user. There is disclosed a method using markers for calculating the position and orientation of an image sensing device from an image in a physical space that is acquired from the image sensing device (e.g., see Japanese Patent Application No. 2006-320872, and Japanese Patent Laid-Open No. 2007-172596).

When building a system which obtains the position and orientation of the viewpoint by using an image in the physical space including markers and enables a user to experience MR by using the obtained position and orientation of the viewpoint, a user having little knowledge of MR does not know an arrangement pattern of markers that stabilizes calculation of the position and orientation of the viewpoint.

SUMMARY OF THE INVENTION

The present invention has been made in consideration of the above-described problem, and provides a technique for creating information for notifying a user of an arrangement pattern of indices that stabilizes calculation of the position and orientation of the viewpoint.

According to an aspect of an exemplary embodiment, an information processing apparatus includes: an acquisition unit configured to acquire information of a position at which a user can experience mixed reality in a physical space; a generation unit configured to generate an arrangement pattern of indices in the physical space used to calculate a position and orientation of a viewpoint of the user based on the information of the position; and an output unit configured to output the arrangement pattern generated by the generation unit.

According to another aspect of an exemplary embodiment, an information processing method includes: acquiring information of a position at which a user can experience mixed reality in a physical space; generating an arrangement pattern of indices in the physical space used to calculate a position and orientation of a viewpoint of the user based on the information of the position; and outputting the generated arrangement pattern.

Further features will become apparent from the following description of exemplary embodiments with reference to the attached drawings.

BRIEF DESCRIPTION OF THE DRAWINGS

FIG. 15 is a flowchart showing processing to be performed by the information processing apparatus.

DESCRIPTION OF THE EMBODIMENTS

Exemplary Embodiments are described below with reference to the accompanying drawings.

First Embodiment

The first embodiment will explain one aspect of an information processing apparatus. This information processing apparatus generates (first generation) a plurality of types of arrangement pattern candidates. Each arrangement pattern candidate is an arrangement pattern candidate of a plurality of indices in a physical space used to calculate the position and orientation of the viewpoint. The arrangement pattern candidate enables observation of at least a predetermined number of indices from a position in an area where mixed reality can be experienced in the physical space. Then, the information processing apparatus generates (second generation) and outputs information representing the arrangement pattern of a plurality of indices in the physical space by using the generated types of arrangement pattern candidates.

Figure 1:
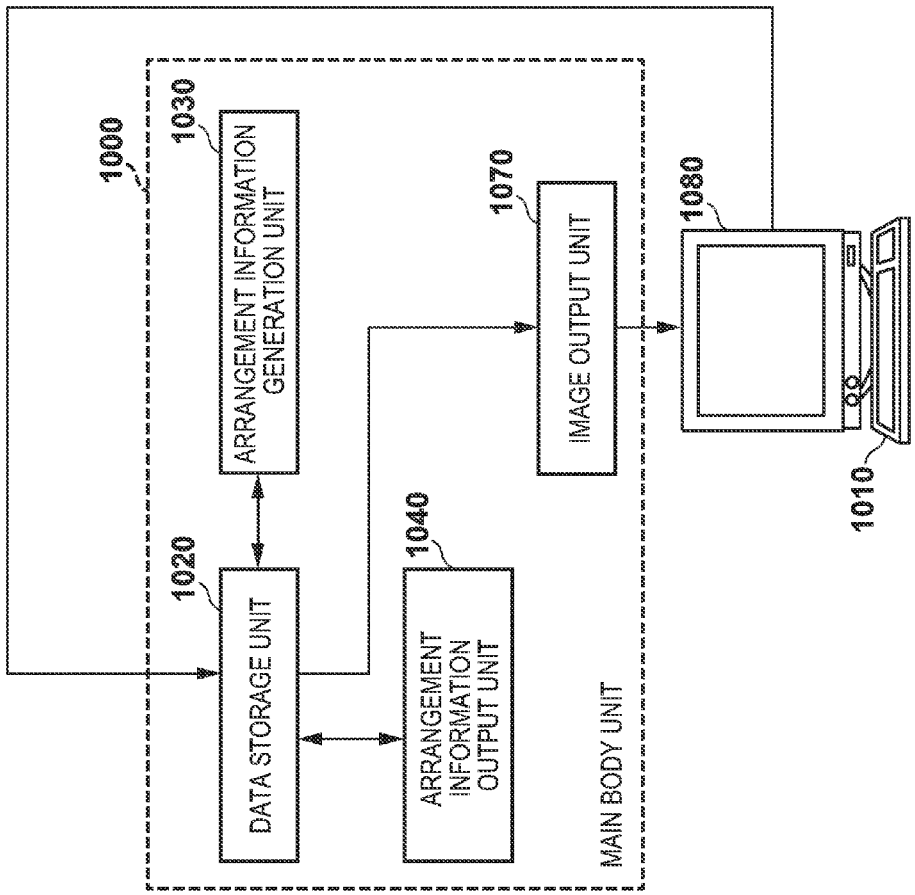
FIG. 1 is a block diagram showing an example of the functional arrangement of an information processing apparatus.

First, an example of the functional arrangement of the information processing apparatus according to the first embodiment will be described with reference to the block diagram of FIG. 1. As shown in FIG. 1, the information processing apparatus according to the embodiment includes a main body unit 1000, display unit 1080, and operation unit 1010.

The display unit 1080 will be explained first. The display unit 1080 is constituted by a CRT, liquid crystal screen, or the like, and displays an image, character, and the like based on data output from the main body unit 1000.

The operation unit 1010 will be explained next. The operation unit 1010 is constituted by a keyboard, mouse, or the like. The user can operate the operation unit 1010 to input various instructions to the main body unit 1000.

The main body unit 1000 will be explained next. As shown in FIG. 1, the main body unit 1000 includes a data storage unit 1020, arrangement information generation unit 1030, arrangement information output unit 1040, and image output unit 1070.

The data storage unit 1020 stores MR experience information input by operating the operation unit 1010 by the user. The MR experience information is information used to decide a plurality of types of arrangement pattern candidates that enable observation of at least a predetermined number of indices from a position in an area where mixed reality can be experienced in a physical space. Details of the MR experience information will be described later.

By using the MR experience information stored in the data storage unit 1020, the arrangement information generation unit 1030 decides a plurality of types of arrangement pattern candidates that enable observation of a predetermined number or more of indices from a position in an area where mixed reality can be experienced in a physical space. The arrangement information generation unit 1030 stores the respective decided arrangement pattern candidates as pieces of index arrangement information in the data storage unit 1020.

By using the pieces of index arrangement information stored in the data storage unit 1020, the arrangement information output unit 1040 generates information representing the arrangement pattern of a plurality of indices in a physical space. The arrangement information output unit 1040 stores the generated information in the data storage unit 1020.

Based on the information stored in the data storage unit 1020 by the arrangement information output unit 1040, the image output unit 1070 generates information representing the arrangement pattern of a plurality of indices in the physical space. The image output unit 1070 outputs the information to the display unit 1080.

Figure 2:
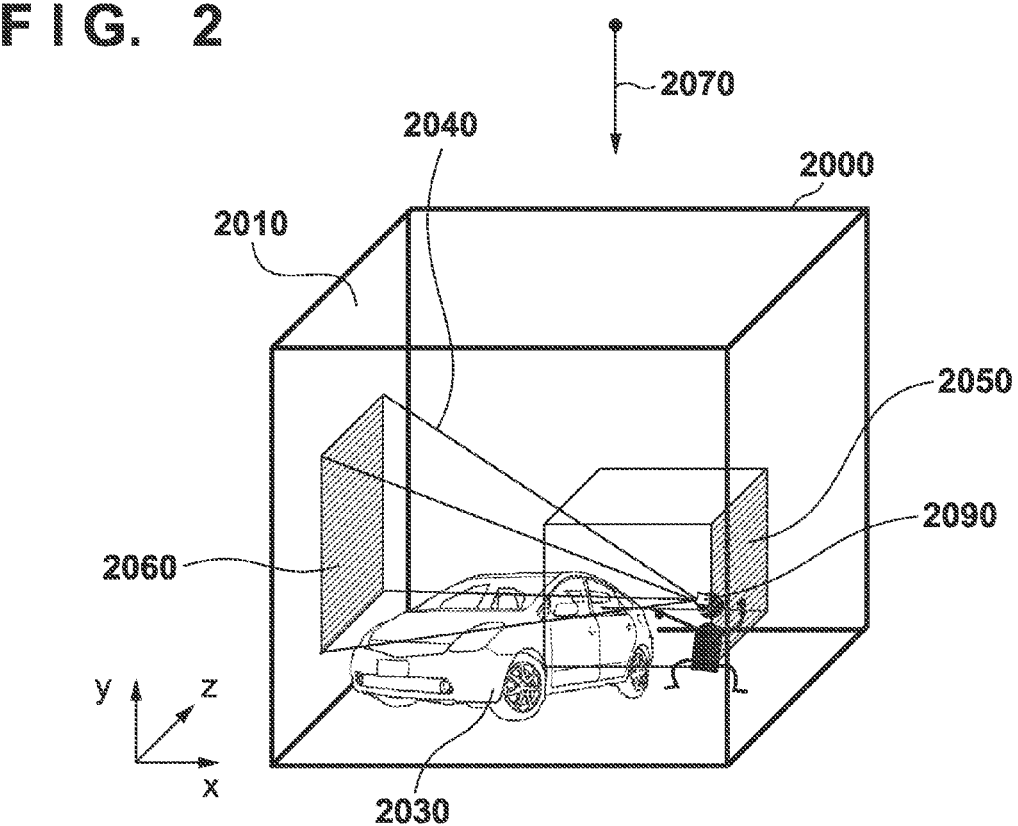
FIG. 2 is a view showing a state in which a user experiences mixed reality.

FIG. 2 shows a state in which the user experiences mixed reality. In FIG. 2, a cube 2000 represents a physical space in an area observable by the user who experiences mixed reality. A plurality of indices are arranged on a wall 2010 in the physical space.

To experience mixed reality, the user mounts a head mounted display on his head. As is well known, the head mounted display includes a display unit, and a camera which senses a physical space. In FIG. 2, reference numeral 2090 denotes a camera.

A cube 2050 represents an area where mixed reality can be experienced in the physical space represented by the cube 2000. As long as the head mounted display is located within the cube 2050, a user who mounts the head mounted display can experience mixed reality. In FIG. 2, the camera senses indices in a region 2060 falling within a field 2040 of view of the camera 2090 on a wall 2010 and outputs the sensed image to a mixed reality presentation apparatus (this apparatus may be the information processing apparatus according to the embodiment or another apparatus). The mixed reality presentation apparatus obtains the position and orientation of the camera 2090 by using the sensed image. A technique for obtaining the position and orientation of the camera 2090 by using a sensed image of indices is a well-known technique as disclosed in, for example, Japanese Patent Application No. 2006-320872, and Japanese Patent Laid-Open No. 2007-172596, described above, and a description of this technique will not be included herein. Then, the mixed reality presentation apparatus generates an image of a virtual object 2030 corresponding to the obtained position and orientation, and sends, to the display unit of the head mounted display, a composite image of the generated image of the virtual object 2030 and the image sensed by the camera 2090. Since this composite image is displayed on the display unit of the head mounted display, the user who mounts the head mounted display on his head can observe the composite image before his eyes, and experience mixed reality.

As described above, the camera 2090 is movable in the area represented by the cube 2050. In accordance with the position of the camera 2090, the appearance of indices arranged on the wall 2010 (in particular, the number of indices falling within the field 2040 of view) changes. If a sufficient number of indices do not fall within the field 2040 of view, the number of indices appearing on a sensed image becomes insufficient, reducing the position/orientation calculation accuracy.

In the embodiment, therefore, the information processing apparatus in FIG. 1 performs processing for deciding an index arrangement pattern in which a sufficient number of indices are sensed in a sensed image regardless of movement of the camera 2090 in the area represented by the cube 2050. The processing to be performed by the information processing apparatus according to the embodiment in order to decide an index arrangement pattern in which a sufficient number of indices are sensed in a sensed image will be explained with reference to FIG. 15 showing the flowchart of this processing.

In step S201, the user inputs MR experience information by operating the operation unit 1010. The control unit (not shown) of the information processing apparatus stores the MR experience information in the data storage unit 1020. As described above, the MR experience information is information used to decide a plurality of types of arrangement pattern candidates that enable observation of at least a predetermined number of indices from a position in an area where mixed reality can be experienced in a physical space. Thus, any information is available as long as the same purpose can be achieved by using the information. For example, assume that the MR experience information contains the following kinds of information:

information (physical space information) which defines a physical space (in FIG. 2, the space represented by the cube 2000) in an area observable by a user who experiences mixed reality information (area information) which defines an area (in FIG. 2, the area represented by the cube 2050) where mixed reality can be experienced in a physical space in an area observable by a user who experiences mixed reality information (for example, information representing the angle of view) representing the field of view of the camera of the head mounted display The physical space information is, for example, information which defines a physical space in an area observable by a user who experiences mixed reality, in a world coordinate system set in the physical space (a coordinate system in which one point in the physical space is set as the origin and three axes perpendicular to each other at the origin are defined as the x-, y- and z-axes). In FIG. 2, the physical space information may be information which defines the space represented by the cube 2000 in the world coordinate system, or information which defines a portion at which indices are arranged in the world coordinate system. The physical space information may also be information which defines, in the world coordinate system, a portion of a virtual object that is designated by the user by operating the operation unit 1010 when the display unit 1080 displays the virtual object simulating a physical space.

The area information is, for example, information representing an area where mixed reality can be experienced in the world coordinate system.

In addition to these pieces of information, the MR experience information may contain pieces of information such as the camera resolution, lens distortion information, focal length information, and information which defines a region where a virtual object is to be arranged.

In step S202, the arrangement information generation unit 1030 reads out the MR experience information from the data storage unit 1020. The positional relationship between a "portion (in FIG. 2, the wall 2010) at which indices are arranged", and an "area where mixed reality can be experienced" in the world coordinate system can be specified by using the physical space information and area information contained in the MR experience information. The arrangement information generation unit 1030 obtains a distance d1 from the portion (in FIG. 2, the wall 2010) at which indices are arranged, to a portion farthest from this portion (in FIG. 2, the wall 2010) in the area where mixed reality can be experienced, and a distance d2 from the portion (in FIG. 2, the wall 2010) at which indices are arranged, to a portion closest to this portion (in FIG. 2, the wall 2010) in the area where mixed reality can be experienced.

Figure 5:
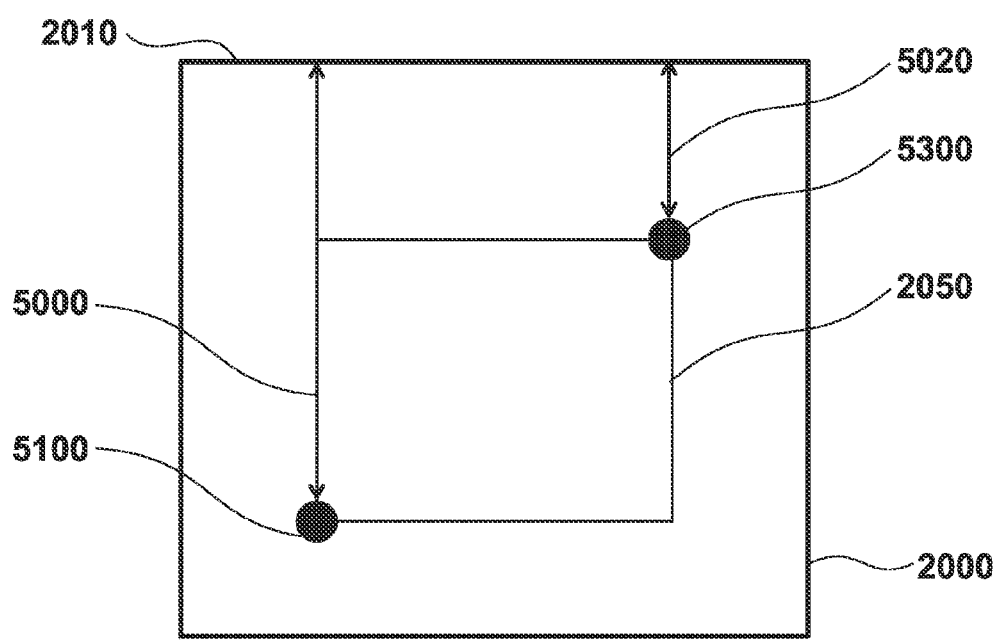
FIG. 5 is a view for explaining processing in step S202.

The processing in step S202 will be explained with reference to an example shown in FIG. 5. FIG. 5 shows a state in which the cube 2000 shown in FIG. 2 is looked down from just above it, as indicated by an arrow 2070.

In FIG. 5, the positional relationship between the wall 2010 serving as a portion at which indices are arranged, and the area (the area represented by the cube 2050) where mixed reality can be experienced can be specified by using the physical space information and area information contained in the MR experience information. In this case, a portion farthest from the wall 2010 in the area where mixed reality can be experienced is a portion 5100, so a distance 5000 between the wall 2010 and the portion 5100 is obtained as d1. A portion closest to the wall 2010 in the area where mixed reality can be experienced is a portion 5300, and thus a distance 5020 between the wall 2010 and the portion 5300 is obtained as d2.

Note that the distances d1 and d2 are not limited to those obtained by the above-mentioned method. For example, maximum and minimum distances input by the user by operating the operation unit 1010 may be set as d1 and d2, respectively.

Referring back to FIG. 15, in step S203, the arrangement information generation unit 1030 first sets d1 as the initial value of a variable D. Then, the arrangement information generation unit 1030 obtains a size S of a rectangle representing an index by calculating S=M×D. M is an appropriate constant, and may be set in advance or set by the user by operating the operation unit 1010. If the rectangle is a square, S may be the length and width. If the rectangle is an oblong, proper constants may be set as M1 and M2 to obtain a length S1=M1×D and a width S2=M2×D. In this manner, the rectangle size can be decided by an arbitrary method as long as the rectangle size is increased as D increases, and is decreased as D decreases.

By using the physical space information contained in the MR experience information, the arrangement information generation unit 1030 specifies a portion at which indices are arranged. The arrangement information generation unit 1030 arranges rectangles each having the size S side by side at this portion, thereby arranging a rectangle array (for example, 10000 in FIG. 8) at this portion. The arrangement is not limited to a specific one, and any arrangement can be employed as long as rectangles can be arranged side by side without projecting from the portion at which indices are arranged. "Arranging a rectangle array" is not processing of actually arranging and rendering rectangles, but processing which is performed schematically in calculation.

Figure 6A:
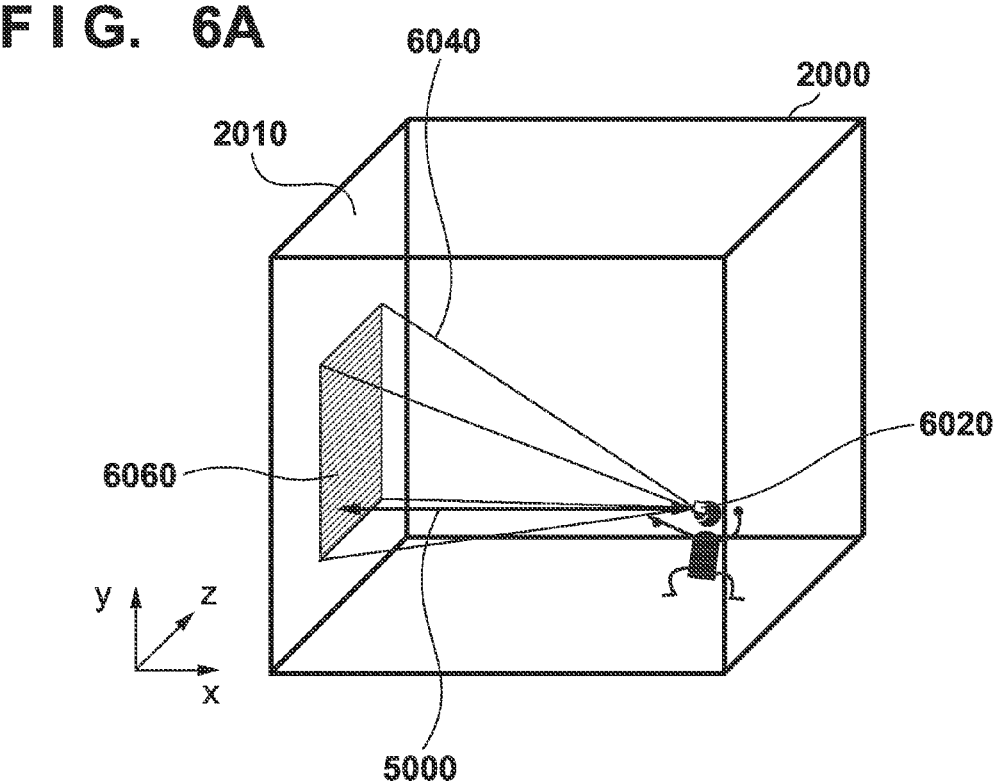
FIGS. 6A and 6B are views for explaining a rectangle array.
Figure 6B:
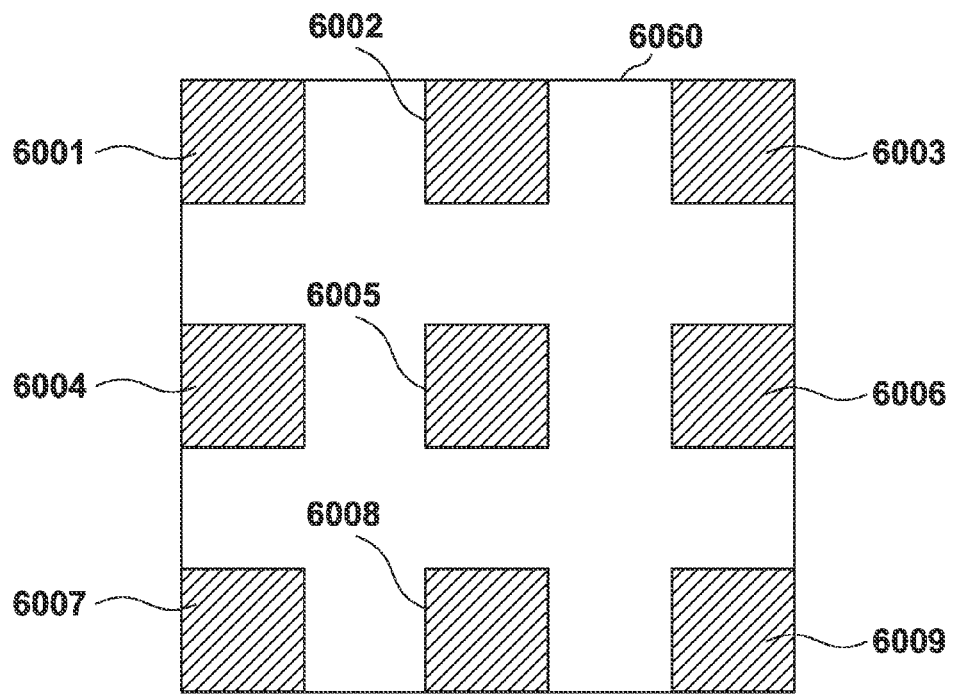

For example, FIG. 6B shows a portion of the rectangle array in a region 6060 falling within a field 6040 of view of a viewpoint 6020 set at a position spaced apart by the distance d1 (5000) from the wall 2010, as shown in FIG. 6A. In FIG. 6B, nine rectangles 6001 to 6009 are contained in the region 6060 and arranged at equal intervals. Further, in step S203, the arrangement information generation unit 1030 registers the set rectangle array as index arrangement information in the data storage unit 1020. The index arrangement information represents the three-dimensional coordinate position (for example, a coordinate position in the world coordinate system) of each rectangle constituting the array. In the example of FIG. 2, the rectangle array is arranged on the wall 2010, and the position and orientation of the wall 2010 in the world coordinate system are defined by physical space information. Hence, the three-dimensional coordinate position of each rectangle on the wall 2010 can be calculated from the physical space information.

In step S204, the arrangement information generation unit 1030 subtracts a predetermined value from the value of the variable D, thereby decreasing the value of the variable D by the predetermined value.

In step S205, the arrangement information generation unit 1030 determines whether the value of the variable D is equal to or smaller than d2. If the arrangement information generation unit 1030 determines that the value of the variable D is equal to or smaller than d2, the process advances to step S209. If the arrangement information generation unit 1030 determines that the value of the variable D is larger than d2, the process advances to step S207.

Figure 7:
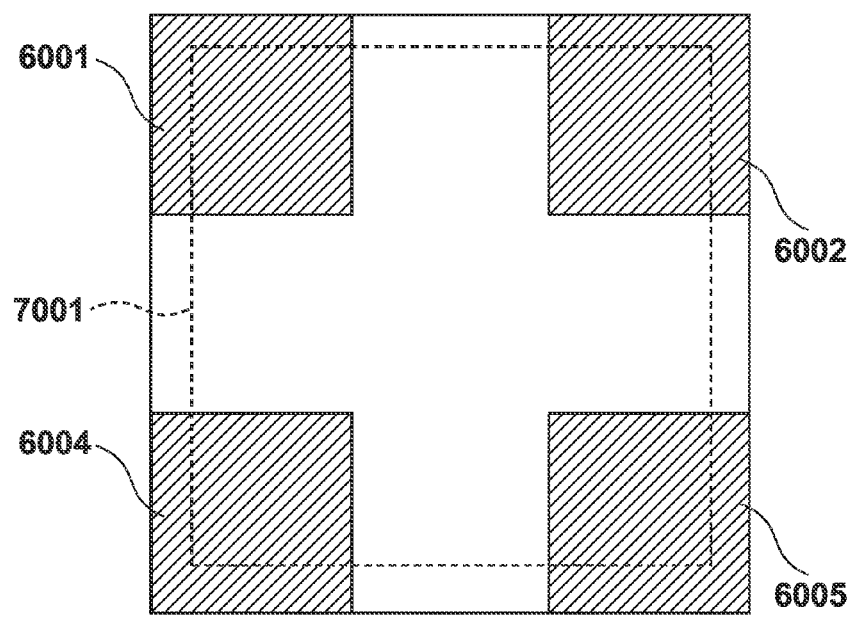
FIG. 7 is a view for explaining processing in step S207.

In step S207, the arrangement information generation unit 1030 determines whether a predetermined number (for example, four) or more of rectangles fall within the field of view of the viewpoint in the currently set rectangle array when the viewpoint is set at a position spaced apart by the distance D from the portion at which indices are arranged. If the arrangement information generation unit 1030 determines that the predetermined number or more of rectangles fall within the field of view of the viewpoint, the process advances to step S204. If the arrangement information generation unit 1030 determines that the predetermined number or more of rectangles do not fall within the field of view of the viewpoint, as shown in FIG. 7 (reference numeral 7001 denotes the inside of the field of view of the viewpoint), the process advances to step S208.

In step S208, the arrangement information generation unit 1030 obtains the size S of the rectangle by calculating S=M×D, as in step S203 described above. By using the physical space information contained in the MR experience information, the arrangement information generation unit 1030 specifies a portion at which indices are arranged. The arrangement information generation unit 1030 arranges rectangles each having the size S side by side at this portion, instead of the previously arranged array, thereby arranging a rectangle array (for example, 11000 in FIG. 9) at this portion. The arrangement information generation unit 1030 registers the set rectangle array as index arrangement information in the data storage unit 1020.

In step S209, the arrangement information output unit 1040 reads out pieces of index arrangement information stored in the data storage unit 1020. By using the readout pieces of index arrangement information, the arrangement information output unit 1040 generates information representing the arrangement pattern of a plurality of indices in the physical space. As processing to be performed in this step, various processes are conceivable. An example of the processing will be explained below.

For descriptive convenience, a case in which information representing the arrangement pattern of a plurality of indices in the physical space is generated by using two types of index arrangement information will be explained. Even when three or more pieces of index arrangement information are used, the following processing is applied in the same way.

First, a composite arrangement pattern is generated by superimposing an arrangement pattern candidate represented by one index arrangement information, and an arrangement pattern candidate represented by the other index arrangement information. FIG. 10 shows an example of a composite arrangement pattern 12000 of the arrangement pattern candidate 10000 in FIG. 8 and the arrangement pattern candidate 11000 in FIG. 9. FIG. 11 shows an enlarged partial region 12100 in the composite arrangement pattern 12000.

Figure 8:
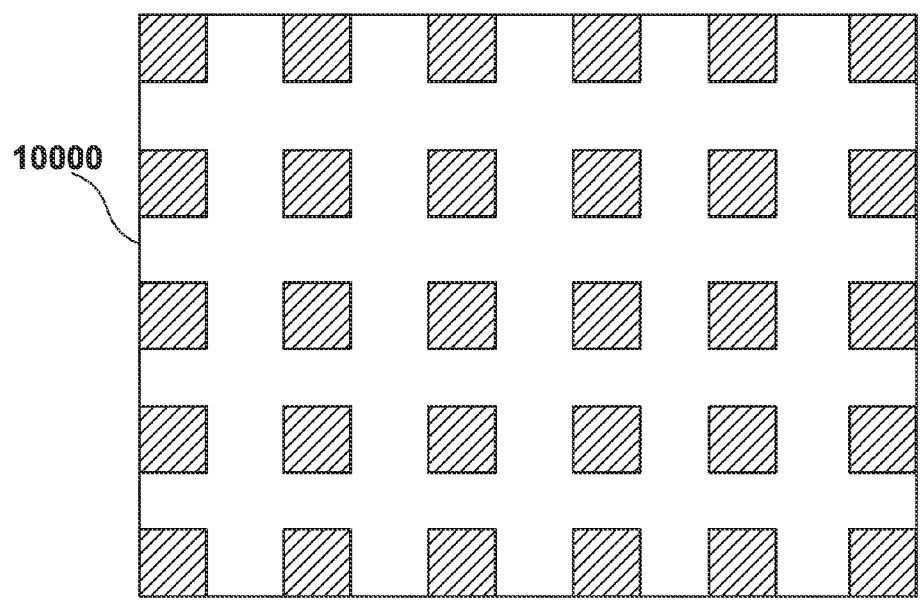
FIG. 8 is a view showing a rectangle array.
Figure 9:
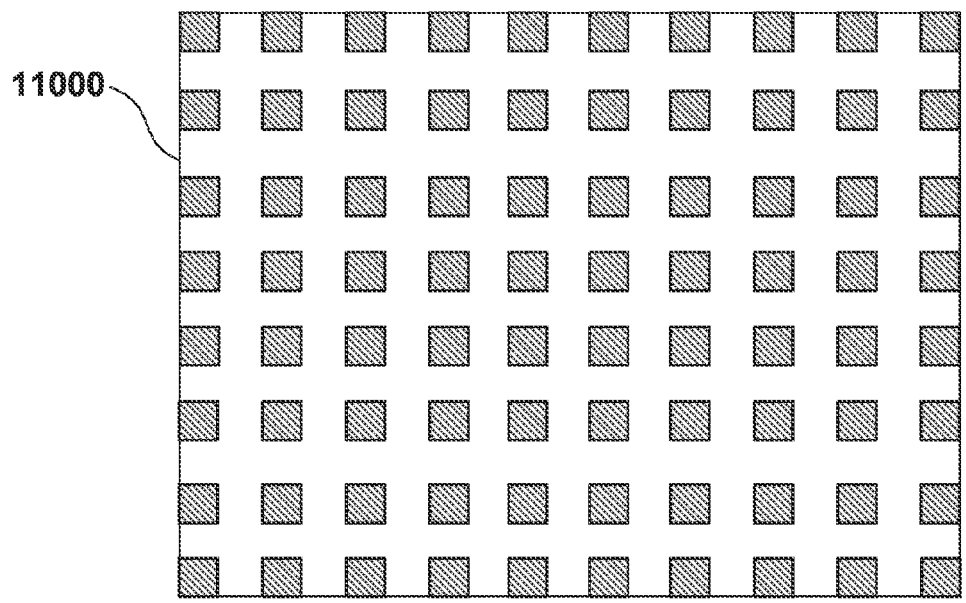
FIG. 9 is a view showing a rectangle array.
Figure 10:
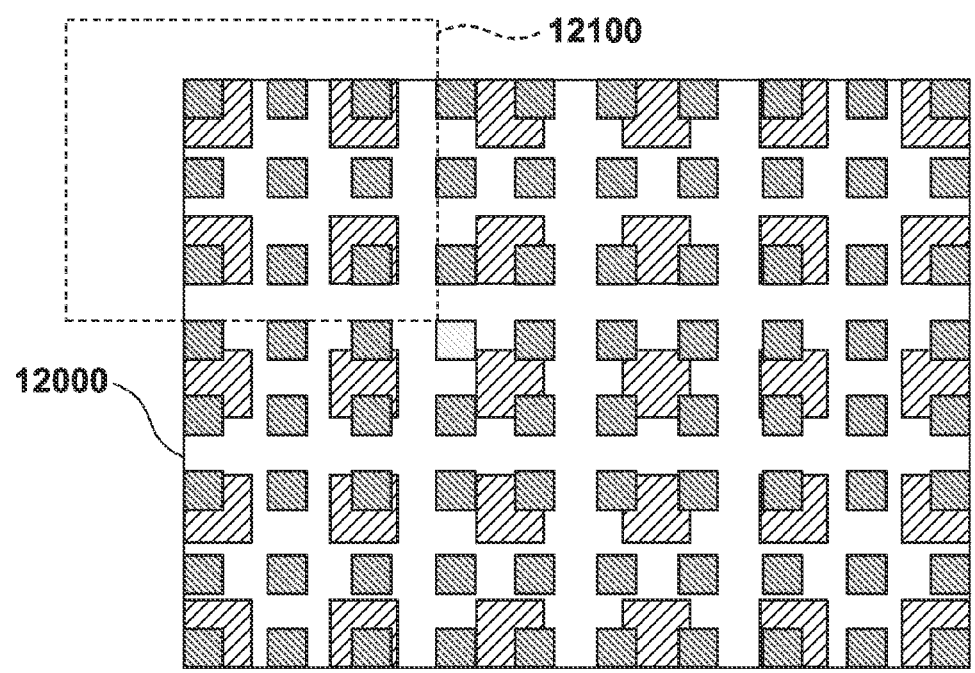
FIG. 10 is a view showing a composite arrangement pattern.
Figure 11:
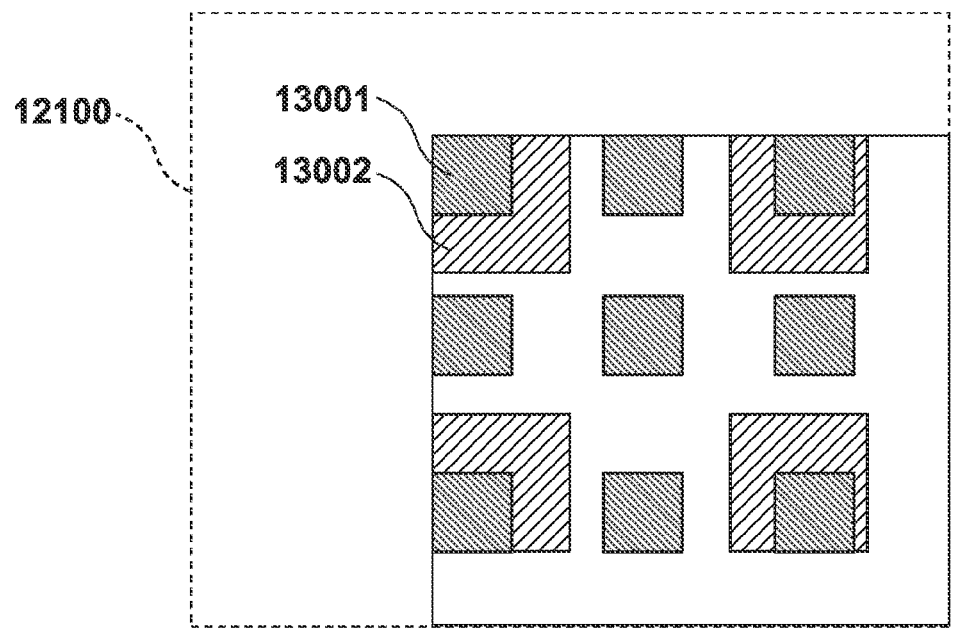
FIG. 11 is a view showing an enlarged partial region in the composite arrangement pattern.

When the composite arrangement pattern 12000 in FIG. 10 of the arrangement pattern candidate 10000 in FIG. 8 and the arrangement pattern candidate 11000 in FIG. 9 is created, a rectangle 13002 in the arrangement pattern candidate 10000 of FIG. 8 and a rectangle 13001 in the arrangement pattern candidate 11000 of FIG. 9 overlap each other as shown in in FIG. 11. Overlapping of rectangles (indices) can be determined by using pieces of index arrangement information corresponding to arrays to which the respective rectangles belong.

Figure 12:
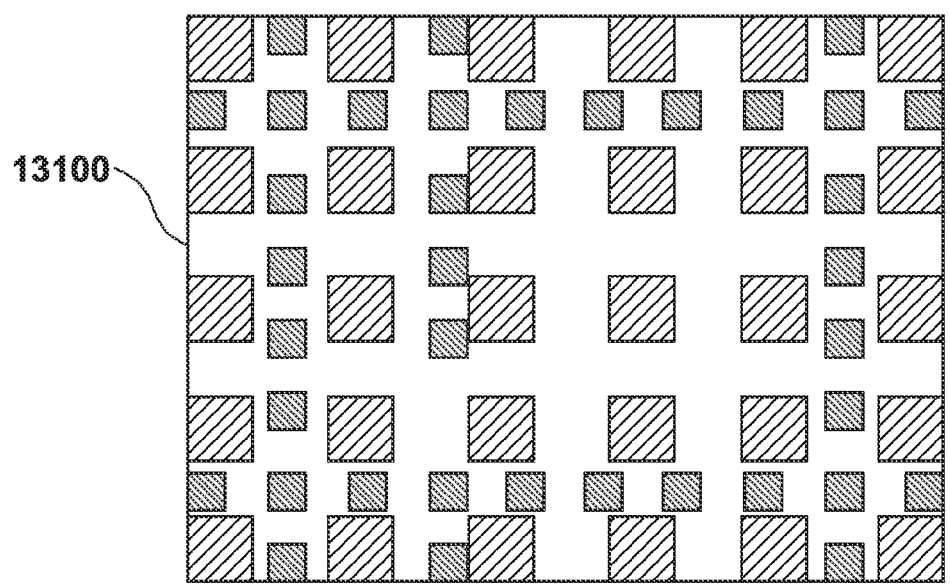
FIG. 12 is a view showing an edited composite arrangement pattern.

As processing to be performed when it is determined that rectangles overlap each other, various processes are conceivable. For example, when A % or more of the area of one rectangle (the rectangle 13001) is contained in the other rectangle (the rectangle 13002), as shown in FIG. 11, this rectangle may be deleted. When this processing is performed for respective rectangles on the composite arrangement pattern 12000 (respective rectangles of the arrangement pattern candidate 10000 in FIG. 8 and the arrangement pattern candidate 11000 in FIG. 9), the composite arrangement pattern 12000 is edited into a composite arrangement pattern 13100 as shown in FIG. 12.

Figure 13:
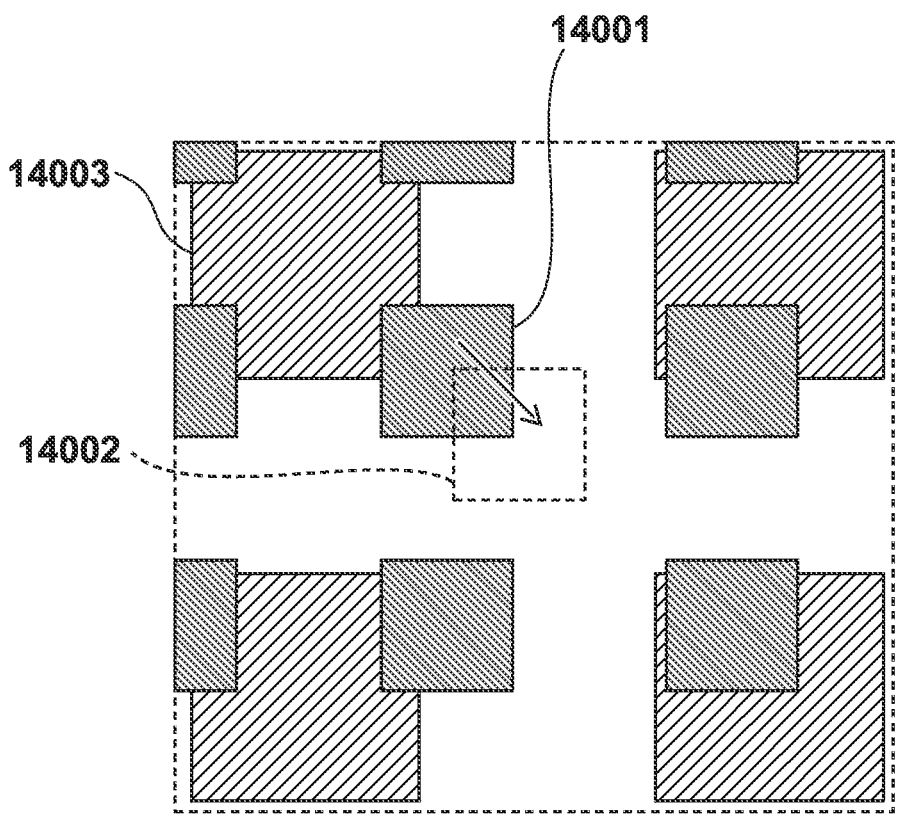
FIG. 13 is a view showing an edited composite arrangement pattern.

When it is determined that rectangles overlap each other, for example, when A % or more of the area of one rectangle (a rectangle 14001) is contained in the other rectangle (a rectangle 14003), as shown in FIG. 13, this rectangle may be moved in a direction indicated by an arrow to a position 14002 so as to cancel overlapping of the rectangles.

Figure 3:
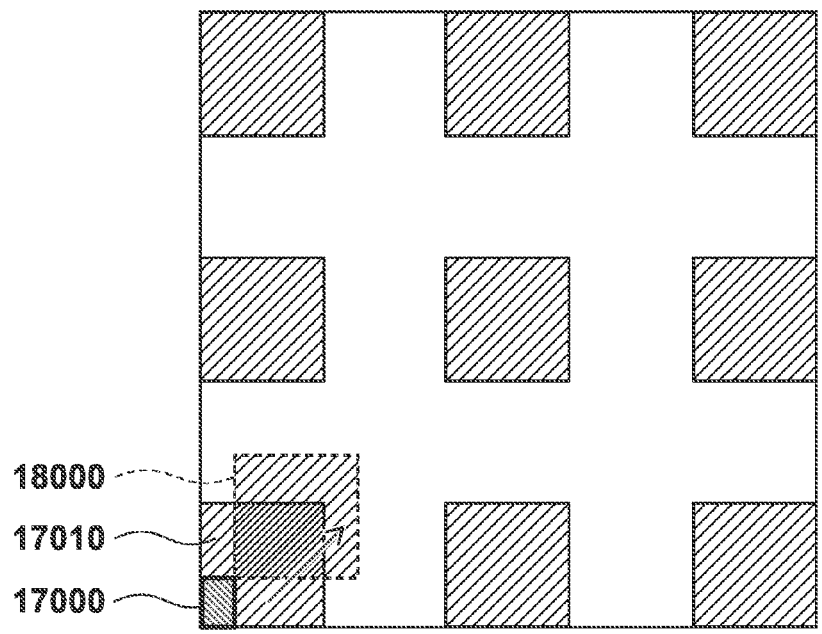
FIG. 3 is a view showing an edited composite arrangement pattern.

When the wall 2010 has an outlet, a region where no index can be physically arranged, or a region 17000 where no index is to be arranged, as shown in FIG. 3, information representing this region may be contained in physical space information in advance. If a rectangle 17010 overlaps the position of the region 17000, the rectangle 17010 may be moved in a direction indicated by an arrow to a position 18000 so as to cancel overlapping of the rectangle.

It is also possible to contain, in advance in physical space information or MR experience information, a position where a virtual object is displayed, and move a rectangle so as to arrange it at the region position. In this fashion, when it is determined that rectangles overlap each other, the composite arrangement pattern may be edited appropriately. Depending on the application, the composite arrangement pattern may not be edited. Alternatively, the composite arrangement pattern may be displayed on the display unit 1080 to prompt the user to edit it. In this case, the user edits the composite arrangement pattern by operating the operation unit 1010 to move or delete one or more rectangles.

In step S210, the arrangement information output unit 1040 stores the edited/unedited composite arrangement pattern in the data storage unit 1020. The composite arrangement pattern may be stored in an arbitrary format in the data storage unit 1020. For example, the composite arrangement pattern may be stored in a digital document format such as pdf or xps, or an image format such as jpeg or bmp. Note that the composite arrangement pattern contains data which defines each rectangle contained in the composite arrangement pattern, such as data of the size or three-dimensional position of each rectangle contained in the composite arrangement pattern.

By executing the above-described processing according to the flowchart of FIG. 15, a composite arrangement pattern serving as information representing the arrangement pattern of a plurality of indices in a physical space can be registered in the data storage unit 1020.

The image output unit 1070 reads out the composite arrangement pattern registered in the data storage unit 1020, and displays it as an image or digital document on the display unit 1080. At this time, the image output unit 1070 may display, on the display unit 1080, even the three-dimensional coordinate position of each rectangle contained in the composite arrangement pattern. The contents displayed on the display unit 1080 are not limited to them, and an interface for experiencing mixed reality may be further displayed.

Note that the portion at which indices are arranged is not limited to the wall, and various portions in a physical space are conceivable. In the embodiment, the user mounts a head mounted display on his head in order to experience mixed reality. However, mixed reality can be experienced even by using an HHD (Hand Held Display), tablet, smartphone, or the like.

Second Embodiment

In the first embodiment, the display unit 1080 displays an image or digital document based on a composite arrangement pattern. However, the output destination of an image or digital document based on a composite arrangement pattern is not limited to the display unit 1080. The second embodiment will describe an information processing apparatus capable of causing a printing device to print an image or digital document based on a composite arrangement pattern.

Figure 4:
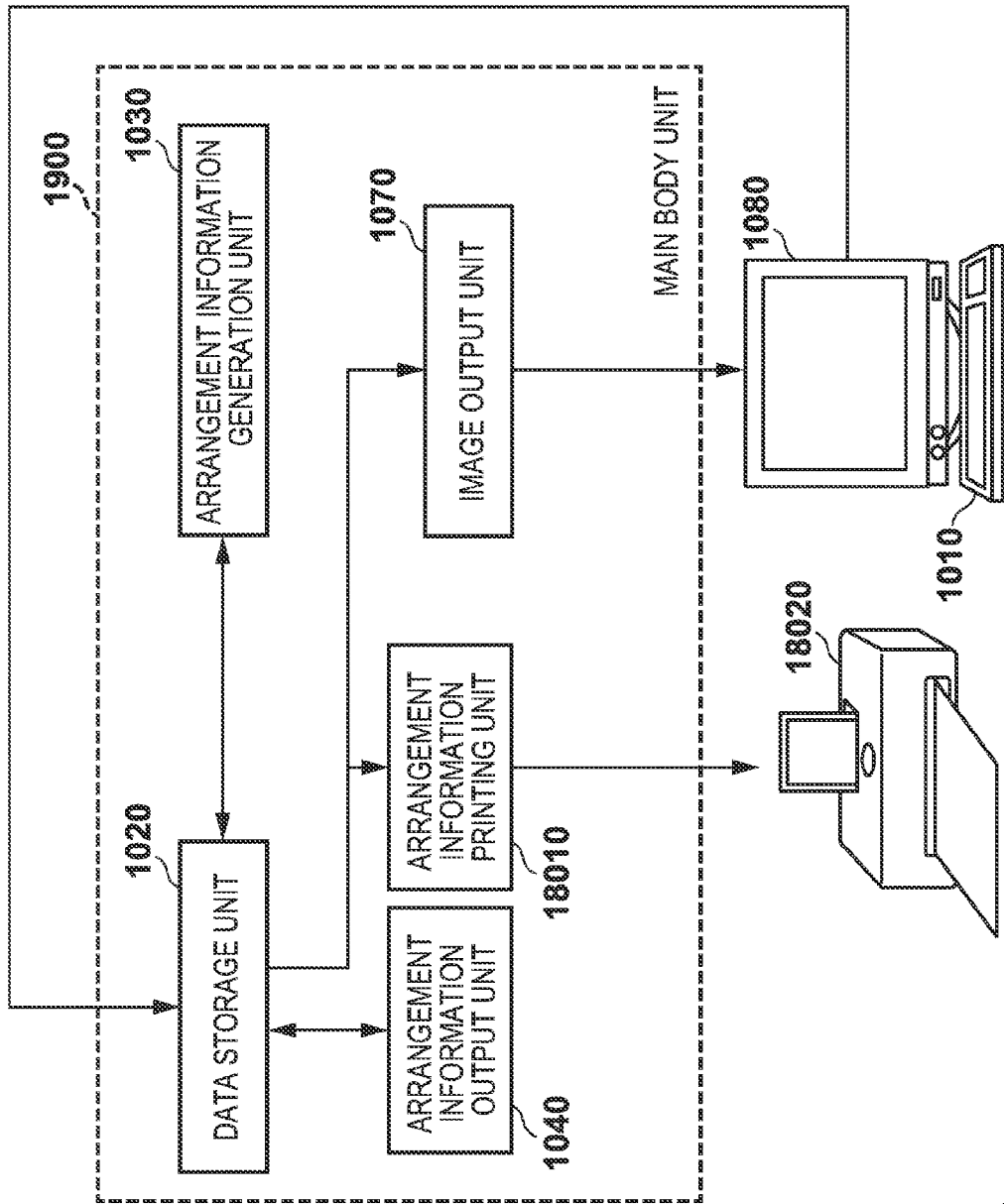
FIG. 4 is a block diagram showing an example of the functional arrangement of an information processing apparatus.

An example of the functional arrangement of the information processing apparatus according to the second embodiment will be described with reference to the block diagram of FIG. 4. In FIG. 4, the same reference numerals as those in FIG. 1 denote the same functional units, and a description of these functional units is the same as the above one and will not be repeated. The arrangement shown in FIG. 4 is different from the arrangement in FIG. 1 in that a main body unit 1900 is configured by adding an arrangement information printing unit 18010 to a main body unit 1000 in FIG. 1, and a printing device 18020 is connected to the main body unit 1900. A difference from the first embodiment will be explained below, and the arrangement is the same as that in the first embodiment, unless otherwise specified below.

The printing device 18020 is connected to the main body unit 1900 directly or indirectly so as to be able to perform data communication with the main body unit 1900. The connection may be wired or wireless.

The arrangement information printing unit 18010 reads out a composite arrangement pattern registered in the data storage unit 1020, generates print data of the composite arrangement pattern, and sends the generated print data to the printing device 18020. The printing device 18020 prints an image, character, or the like on a printing medium such as paper in accordance with the print data.

Third Embodiment

In the first embodiment, the user inputs physical space information by operating the operation unit 1010. However, a three-dimensional measurement device or the like may be used to measure three-dimensional information of a physical space in an area observable by a user who experiences mixed reality, and the measurement result may be acquired as physical space information.

Fourth Embodiment

In the first embodiment, the user inputs physical space information by operating the operation unit 1010. After that, the user may appropriately edit the physical space information by operating the operation unit 1010. Depending on the application, the input physical space information may be converted into, for example, physical space information representing a more simplified physical space. That is, input physical space information may be directly used, or may be modified and used in subsequent processing.

Fifth Embodiment

Although the respective functional units constituting a main body unit 1000 shown in FIG. 1 or a main body unit 1900 shown in FIG. 4 may be constructed by hardware, the respective functional units except for a data storage unit 1020 may be constructed by software (computer programs). In the latter case, a computer which includes a memory functioning as the data storage unit 1020 and includes a processor capable of executing the computer programs can be applied to the main body unit 1000 shown in FIG. 1 or the main body unit 1900 shown in FIG. 4.

Figure 14:
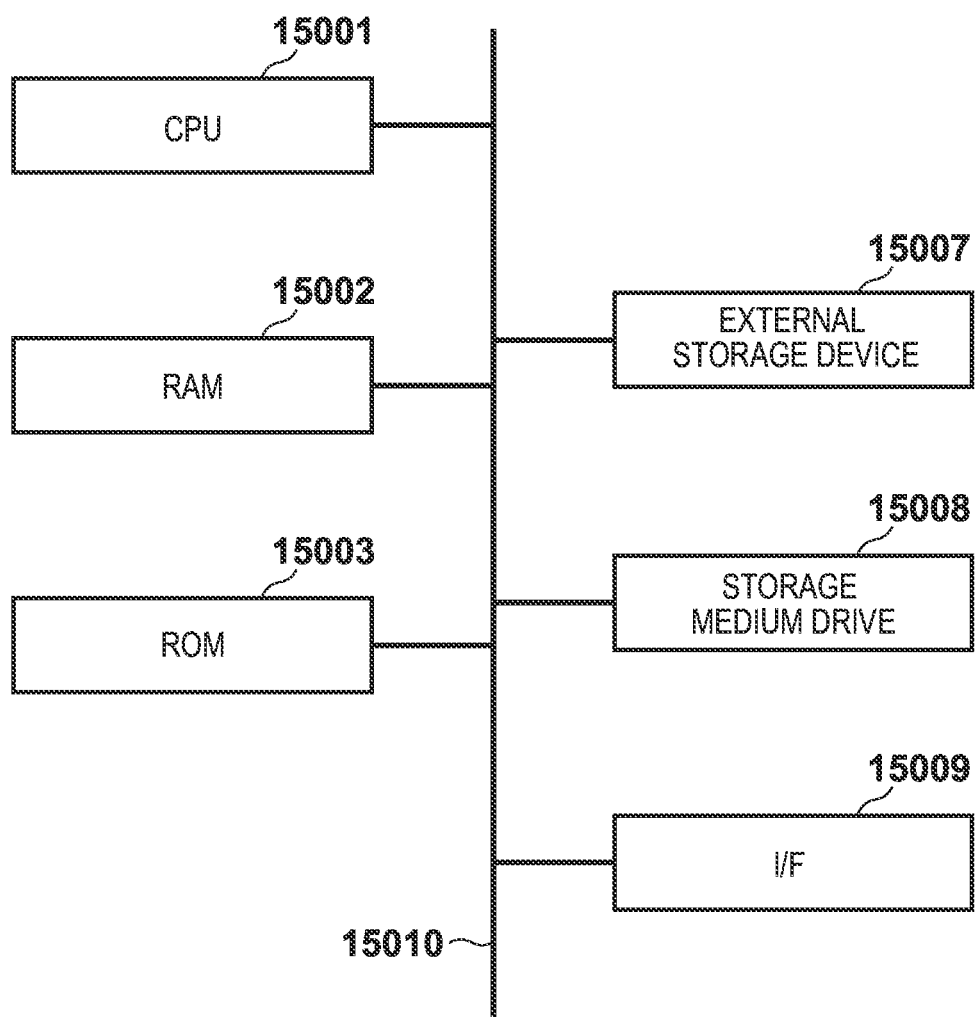
FIG. 14 is a block diagram showing an example of the hardware arrangement of a computer.

An example of the hardware arrangement of the computer applicable to the main body unit 1000 shown in FIG. 1 or the main body unit 1900 shown in FIG. 4 will be explained with reference to the block diagram of FIG. 14. Note that the arrangement shown in FIG. 14 is an example of the arrangement of this computer, and the present invention is not limited to this arrangement.

A CPU 15001 controls the operation of the overall computer by executing processing using a computer program and data stored in a RAM 15002 or ROM 15003. In addition, the CPU 15001 executes each processing described to be performed by the main body unit 1000 shown in FIG. 1 or the main body unit 1900 shown in FIG. 4.

The RAM 15002 has an area for storing computer programs and data loaded from an external storage device 15007 or storage medium drive 15008, and computer programs and data externally received via an I/F (interface) 15009. Further, the RAM 15002 has a work area used when the CPU 15001 executes various processes. That is, the RAM 15002 can properly provide various areas.

The ROM 15003 stores setting data of the computer, a boot program, and the like.

The external storage device 15007 is a mass information storage device typified by a hard disk drive. The external storage device 15007 saves an OS (Operating System), and a computer program and data for causing the CPU 15001 to execute each processing described to be performed by the main body unit 1000 shown in FIG. 1 or the main body unit 1900 shown in FIG. 4. The external storage device 15007 also saves information described as known information. The computer programs and data saved in the external storage device 15007 are appropriately loaded into the RAM 15002 under the control of the CPU 15001, and processed by the CPU 15001. Note that the RAM 15002 and external storage device 15007 function as the data storage unit 1020 in FIG. 1.

The storage medium drive 15008 reads out computer programs and data recorded on a storage medium such as a CD-ROM or DVD-ROM, and outputs them to the RAM 15002 or external storage device 15007. Some of the computer programs and data described to be saved in the external storage device 15007 may be recorded on this storage medium.

The I/F 15009 is constituted by one or more interfaces for connecting an external device to the computer. An operation unit 1010, display unit 1080, and printing device 18020 described above are connected to the I/F 15009. For example, the I/F 15009 is constituted by a digital input/output port such as a USB for connecting the printing device 18020, and a DVI or HDMI port for connecting the display unit 1080. The above-mentioned head mounted display may be connected to the I/F 15009. The respective units described above are connected to a bus 15010.

Other Embodiments

Embodiments can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
an acquisition unit configured to acquire information of a position, in a real space, at which a user can observe a virtual object;
a generation unit configured to generate, on the basis of the information of the position, a location map of indices, the indices are to be located in the real space, wherein the virtual object is to be generated based on the indices, and wherein the location information represents positions where the indices are to be located; and
an output unit configured to output the location information generated by the generation unit,
wherein the location information is a location map representing relative positional relationships among the indices, and
wherein the generation unit generates the location map by generating a plurality of location map candidates of the indices, and combining the generated location map candidates.

2. The apparatus according to claim 1, wherein the generation unit generates the location map by deleting at least one index to prevent overlapping of indices in a combined location map obtained by combining the location map candidates.

3. The apparatus according to claim 1, wherein the generation unit generates the location map by moving at least one index to prevent overlapping of indices in a combined location map obtained by combining the location map candidates.

4. The apparatus according to claim 1, wherein the generation unit generates the plurality of location map candidates by generating the location map candidates for respective index sizes.

5. The apparatus according to claim 1, wherein the generation unit
acquires, based on the information of the position, an area where the virtual object can be observed;
generates, as a location map candidate, an array of indices each having a size corresponding to a distance from a first position to a portion at which the indices are to be located;
locates the array at the portion; and
when the number of indices in the array that are observable from a second position closer to the portion than the first position is smaller than a predetermined value, generates, as a location map candidate, an array of indices each having a size corresponding to a distance from the second position to the portion, and locates the array at the portion.

6. The apparatus according to claim 1, wherein the index has a square shape.

7. The apparatus according to claim 1, further comprising an image sensing unit information acquisition unit configured to acquire information of an image sensing unit,
wherein in addition to the information of the position, the generation unit generates at least one location information based on the information of the image sensing unit.

8. The apparatus according to claim 7, wherein the information of the image sensing unit includes at least one of a camera resolution, lens distortion information, and focal length information.

9. The apparatus according to claim 1, further comprising an arrangement information acquisition unit configured to acquire arrangement information for arranging the virtual object,
wherein the generation unit generates the location map based on the information of the position and the arrangement information.

10. The apparatus according to claim 1, further comprising:
a unit configured to acquire an image which is obtained by capturing the real space using an image capturing device after locating the indices in the real space;
a virtual object generation unit configured to generate a virtual object based on the indices in the acquired image; and
a composition image output unit configured to output a composition image which is obtained by composing the acquired image and the generated virtual object.

11. The apparatus according to claim 10, wherein the image capturing device which captures the real space is attached with a head-mounted display that the user wears on his/her head.

12. The apparatus according to claim 1, further comprising:
a unit configured to acquire an image which is obtained by capturing the real space after locating the indices in the real space;
a virtual object generation unit configured to generate the virtual object based on the indices in the acquired image; and
a virtual object output unit configured to output the generated virtual object.

13. The apparatus according to claim 12, wherein a device which captures the real space is attached with a head-mounted display that the user can wear on his/her head.

14. The apparatus according to claim 1, wherein the output unit outputs the location map to a print device or a display device.

15. The apparatus according to claim 1, wherein the indices are to be used for calculating a position and orientation of a viewpoint of the user, and wherein the virtual object is to be generated based on the calculated position and orientation of the viewpoint of the user.

16. An information processing method comprising:
acquiring information of a position, in a real space, at which a user can observe a virtual object;
generating, on the basis of the information of the position, location information of indices, wherein the indices are to be located in the real space, wherein the virtual object is to be generated based on the indices, and wherein the location information represents positions where the indices are to be located; and
outputting the generated location information,
wherein the location information is a location map representing relative positional relationships among the indices, and
wherein the location map is generated by generating a plurality of location map candidates of the indices, and combining the generated location map candidates.

17. A non-transitory computer-readable medium storing a computer program for causing a computer to function as:
an acquisition unit configured to acquire information of a position, in a real space, at which a user can observe a virtual object;
a generation unit configured to generate, on the basis of the information of the position, location information of indices, wherein the indices are to be located in the real space, wherein the virtual object is to be generated based on the indices, and wherein the location information represents positions where the indices are to be located; and an output unit configured to output the location information generated by the generation unit,
wherein the location information is a location map representing relative positional relationships among the indices, and
wherein the generation unit generates the location map by generating a plurality of location map candidates of the indices, and combining the generated location map candidates.

18. An information processing apparatus comprising:
an acquisition unit configured to acquire distance information indicating a distance between a position in a first region in a real space where a user holding a display device can observe a virtual object displayed in the display device and a position in a second region in the real space, on which at least one index is to be located, wherein the virtual object is to be generated based on the at least one index;
a generation unit configured to generate, on the basis of the distance information, location information of the at least one index, wherein the location information includes position information of the at least one index and size information of the at least one index, wherein the location information is generated so that a camera of the user in the first region can observe a predetermined number of one or more indices; and
an output unit configured to output the location information generated by the generation unit.

19. The apparatus according to claim 18, wherein a size of the at least one index indicated by the size information is larger as the distance indicated by the acquired distance information is larger.

20. The apparatus according to claim 18, wherein the at least one index can be used for calculating a position and orientation of a viewpoint of the user, and wherein the virtual object can be generated based on the calculated position and orientation of the viewpoint of the user.

21. An information processing method comprising:
acquiring distance information indicating a distance between a position in a first region in a real space where a user holding a display device can observe a virtual object displayed in the display device and a position in a second region in the real space, on which at least one index is to be located, wherein the virtual object is to be generated based on the at least one index;
generating, on the basis of the distance information, location information of the at least one index, wherein the location information includes position information of the at least one index and size information of the at least one index, wherein the location information is generated so that a camera of the user in the first region can observe a predetermined number of one or more indices; and
outputting the location information.

22. A non-transitory computer-readable medium storing instructions that, when executed by one or more computers, cause the one or more computers to perform operations comprising:
acquiring distance information indicating a distance between a position in a first region in a real space where a user holding a display device can observe a virtual object displayed in the display device and a position in a second region in the real space, on which at least one index is to be located, wherein the virtual object is to be generated based on the at least one index;
generating, on the basis of the distance information, location information of the at least one index, wherein the location information includes position information of the at least one index and size information of the at least one index, wherein the location information is generated so that a camera of the user in the first region can observe a predetermined number of one or more indices; and
outputting the location information.

23. An information processing apparatus comprising:
an acquisition unit configured to acquire first region information of a first region in a real space where a user holding a display device can observe a virtual object displayed in the display device;
an obtaining unit configured to obtain second region information of a second region in the real space, on which at least one index is to be located, wherein the virtual object is to be generated based on the at least one index;
a generation unit configured to generate, on the basis of the first region information and the second region information, location information of the at least one index, wherein the location information represents a position where the at least one index is to be located in the second region; and
an output unit configured to output the location information generated by the generation unit.

24. The apparatus according to claim 23, wherein the generation unit generates the location information of the at least one index on the basis of the first region information and the second region information so that a size of the at least one index indicated by the location information is larger as a distance between a position in the first region and a position in the second region is larger.

25. The apparatus according to claim 23, wherein the at least one index can be used for calculating a position and orientation of a viewpoint of the user, and wherein the virtual object is to be generated based on the calculated position and orientation of the viewpoint of the user.

26. The apparatus according to claim 23, further comprising a second acquiring unit configured to acquire third information of the real space;
wherein the obtaining unit obtains the second region information based on the first region information and the third information.

27. An information processing method comprising:
acquiring first region information of a first region in a real space where a user holding a display device can observe a virtual object displayed in the display device;
obtaining second region information of a second region in the real space, on which at least one index is to be located, wherein the virtual object is to be generated based on the at least one index;
generating, on the basis of the first region information and the second region information, location information of the at least one index, wherein the location information represents a position where the at least one index is to be located in the second region; and
outputting the generated location information.

28. A non-transitory computer-readable medium storing instructions that, when executed by one or more computers, cause the one or more computers to perform operations comprising:
acquiring first region information of a first region in a real space where a user holding a display device can observe a virtual object displayed in the display device;
obtaining second region information of a second region in the real space, on which at least one index is to be located, wherein the virtual object is to be generated based on the at least one index;

generating, on the basis of the first region information and the second region information, location information of the at least one index, wherein the location information represents a position where the at least one index is to be located in the second region; and outputting the generated location information.

\* \* \* \* \*